(12) United States Patent
Chen

(10) Patent No.: US 9,414,308 B2
(45) Date of Patent: Aug. 9, 2016

(54) METHOD OF CONTROLLING WIRELESS NETWORK DEVICE FOR NETWORK CONNECTIVITY

(71) Applicant: Hsiao-Chi Chen, New Taipei (TW)

(72) Inventor: Hsiao-Chi Chen, New Taipei (TW)

( * ) Notice: Subject to any disclaimer, the term of this patent is extended or adjusted under 35 U.S.C. 154(b) by 0 days.

(21) Appl. No.: 14/305,091

(22) Filed: Jun. 16, 2014

(65) Prior Publication Data

US 2015/0024769 A1 Jan. 22, 2015

(30) Foreign Application Priority Data

Jul. 22, 2013 (TW) .............................. 102213772 U
Feb. 10, 2014 (TW) .............................. 103104234 A

(51) Int. Cl.
*H04W 48/20* (2009.01)
*H04W 88/08* (2009.01)
*H04W 84/04* (2009.01)

(52) U.S. Cl.
CPC ............ *H04W 48/20* (2013.01); *H04W 84/047* (2013.01); *H04W 88/08* (2013.01)

(58) Field of Classification Search
None
See application file for complete search history.

(56) References Cited

U.S. PATENT DOCUMENTS

| 6,075,482 | A * | 6/2000 | Fukushima | .......... | H01Q 1/3275 |
| | | | | | 342/359 |
| 2010/0188971 | A1* | 7/2010 | Chiang | .......................... | 370/225 |
| 2013/0034136 | A1* | 2/2013 | Park | ........................ | H04B 7/026 |
| | | | | | 375/219 |
| 2013/0143563 | A1* | 6/2013 | Singh et al. | .................... | 455/436 |
| 2014/0185600 | A1* | 7/2014 | Cheng | ..................... | H04L 49/35 |
| | | | | | 370/338 |

FOREIGN PATENT DOCUMENTS

| CN | 103546353 A | 1/2014 |
| JP | 2000013861 A | 1/2000 |
| JP | 2002-319890 A | 10/2002 |
| JP | 2004364436 A | 12/2004 |
| JP | 2013089983 A | 5/2013 |
| TW | 200539617 A | 12/2005 |
| TW | 200816660 A | 4/2008 |
| TW | 201116089 A | 5/2011 |

OTHER PUBLICATIONS

G-router GSM/GPRS to RS-232 and Ethernet Gateway Quick Installation Guide by RFI Support Team, Revision A0, dated Jan. 12, 2012.*

* cited by examiner

*Primary Examiner* — Daniel Lai
(74) *Attorney, Agent, or Firm* — Li & Cai Intellectual Property (USA) Office

(57) ABSTRACT

This invention provides a method of a controlling wireless network device for network connectivity. The method includes the following steps, receiving a control signal from a mobile communication device; receiving multiple connection signals emitted by multiple base stations; measuring the signal strength of the connection signals emitted by the base stations to determine the communication signal having the strongest received signal strength indication; connecting to the base station emitted the communications signal with the strongest signal strength indication; connecting the mobile communication device to connect to the controlling wireless network device and establishing network connectivity between the mobile communication device to the base station emitted the communications signal with the strongest signal strength indication.

11 Claims, 3 Drawing Sheets

METHOD OF CONTROLLING WIRELESS NETWORK DEVICE FOR NETWORK CONNECTIVITY

BACKGROUND

1. Technical Field

The present invention relates to a method of controlling wireless network device for network connectivity, and in particular to a method of enhancing the reception quality of the mobile communication device.

2. Description of Related Art

When the user utilizes the mobile communication device, the mobile communication device can wireless communicate through the base station. For instance, the mobile communication device can wirelessly connect through the 3G signal emitted from the base station. In general, the signal strength of the communication signal of the base station might be affected by the external environment (such as: decoration, device, wall, or other shelter) and changes in different places. Even more, When the mobile communication device positions on the boundary of wireless network space covered by the base station, the signal strength of wireless network signal received by the mobile communication device from the base station might be weaker.

Thus, when the user utilizes the mobile communication device in motion, the signal strength of the signal form the base station received by the mobile communication device might vary as the positions. The user has to change the position of the mobile communication device, remove the mobile communication device from the shelter, or adjacent the angle of the mobile communication device, so as to enhance the strength of the wireless network signal received by the mobile communication device. In such condition, the user cannot easily control the position of the mobile communication device with stronger signal strength.

In addition, the built-in antenna of the mobile communication device has to newly search the nearby signal of the base station as the motion of the user and connect with the base station. In such situation, the power consumption of the mobile communication device is rapid.

SUMMARY

The embodiment in the present invention provides a method of controlling wireless network device for network connectivity, which can enhance the reception quality of the mobile communication device.

The embodiment in the present invention provides a method of controlling wireless network device for network connectivity. The method includes receiving a control signal emitted from a mobile communication device, receiving a plurality of communication signals emitted from a plurality of base stations, measuring the received signal strength indication of the communication signals emitted from the base stations to determine the communication signal having the strongest received signal strength indication, connecting to the base station emitting the communication signal with the strongest signal strength indication, and connecting the mobile communication device to the controlling wireless network device and establishing network connectivity between the mobile communication device to the base station emitting the communication signal with the strongest signal strength indication.

To sum up, the present invention provides a method of controlling wireless network device for network connectivity. The mobile communication device connects to the wireless network device thorough the control signal. The first antenna receives at least a communication signal emitted from the base station. The processing unit determines the communication signal having the strongest received signal strength indication and generates the driving signal to the antenna turning control unit. The antenna turning control unit receives the driving signal to drive the first antenna changing the direction and to connect to the base station emitting the communication signal with the strongest signal strength indication. In other words, the first antenna connects to the base station emitting communication signal with the strongest signal strength by controlling the turning direction of the first antenna. Then, the communication signal with the strongest signal strength indication is transmitted to the mobile communication device through the second antenna, so as to enhance the quality of communication signal received by the mobile communication device.

Hence, compare to the conventional method of network connectivity, the method of controlling wireless network device for network connectivity in the present invention can replace the function about searching the signal of the base station of the built-in antenna of the mobile communication device. When the user utilizes the mobile communication device in motion, the built-in antenna of the mobile communication device does not have to search the stronger signal of the base station along with different positions. Therefore, the reception quality of the mobile communication device can be enhanced and the power consumption of the mobile communication device can save automatically.

In order to further appreciate the characteristic and technical contents of the present invention, references are hereunder made to the detailed descriptions and appended drawings in connection with the present invention. However, the appended drawings are merely shown for exemplary purpose rather than being used to restrict the scope of the present invention.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
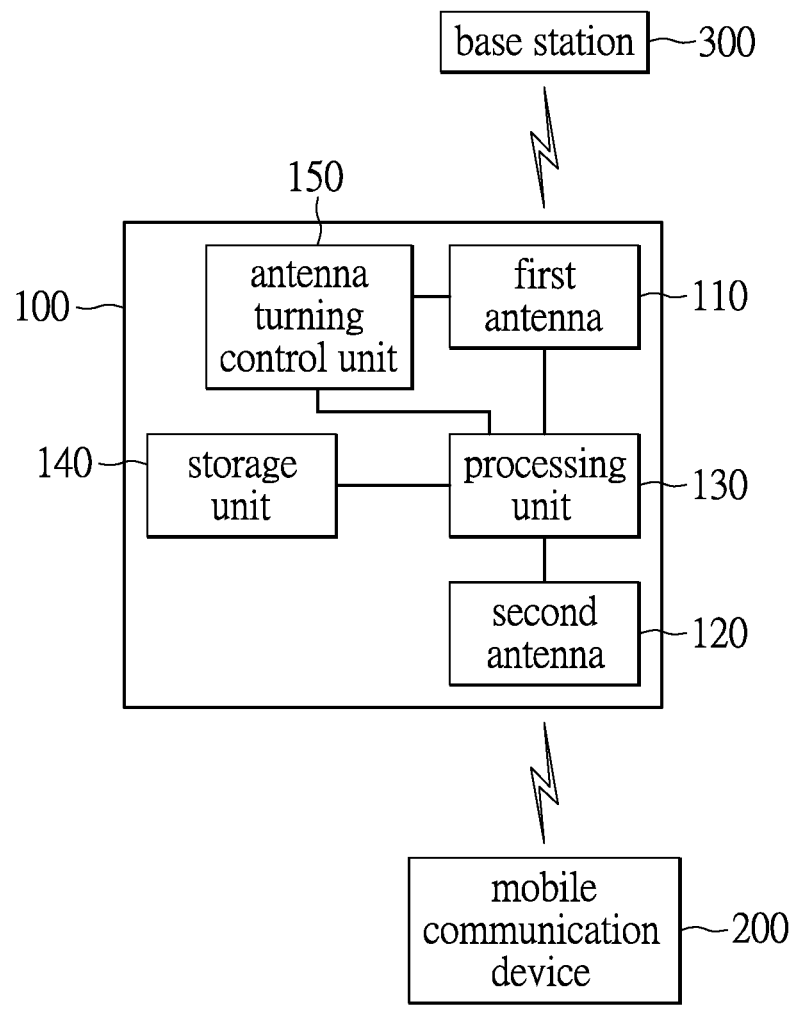
FIG. 1 is a block diagram of a wireless network device provided in accordance to a first embodiment of the present invention.

FIG. 1 is a block diagram of a wireless network device provided in accordance to a first embodiment of the present invention. Referring to FIG. 1, the wireless network device 100 wirelessly connects to the base station 300 and the wireless network device 100 connects to the mobile communication device 200. The wireless network device 100 is utilized to receive or transmit the signal from the base station 300. The wireless network device 100 is utilized to receive a control signal generated by the mobile communication device 200 and emit or receive a data signal with the mobile communication device 200. The wireless network device 100 includes a first antenna 110, a second antenna 120, a processing unit 130, a storage unit 140, and an antenna turning control unit 150. The first antenna 110 and the second antenna 120 couple with the processing unit 130 individually. The processing unit 130 couples with the storage unit 140. The antenna turning control unit 150 couples with the first antenna 110 and couples with the processing unit 130. It worth noting that, the present invention focuses on the function of the wireless network device 100, the person skilled in the art should know the function of the base station 300 and the mobile communication device 200, and the description is omitted.

The wireless network device 100 is utilized to provide the connection with the mobile communication device 200. Specifically, the wireless network device 100 can be the relay node between the mobile communication device 200 and the base station 300, so as to make the mobile communication device 200 transmit the signal. In the present invention, the wireless network device 100 can be the Wi-Fi access point, the Bluetooth connection device or other device with the wireless transmitting function, the present invention is not limited thereto.

The first antenna 110 is utilized to emit the data signal from the mobile communication device 200 or receive the data signal emitted from the base station 300. It worth noting that, in the present invention, the first antenna 110 is a directional antenna. Those skilled in the art should be able to replace the directional antenna with the antenna array, the omnidirectional antenna, or other antenna as embodiment, the present invention is not limited thereto.

The second antenna 120 is utilized to receive the control signal or the data signal emitted from the mobile communication device 200, or emit the data signal to the mobile communication device 200. In the embodiment of the present invention, the second antenna 120 is an omnidirectional antenna. It worth noting that, the second antenna 120 can be replaced with other antenna, the present invention is not limited thereto. In addition, in the embodiment of the present invention, the wireless network device 100 can connect to the mobile communication device 200 by the wired connection. For instance, the mobile communication device 200 can connect to the wireless network device 100 by the data transmission line, and wirelessly connect to the base station 300 by the wireless network device 100 to transmit the control signal or the data signal.

The processing unit 130 is utilized to provide the operation processing function for the wireless network device 100. Specifically, when the wireless network device 100 receives the control signal emitted from the mobile communication device 200, the processing unit 130 can further generate a command to control the antenna turning control unit 150, so as to adjust the direction of the first antenna 110. When the wireless network device 100 receives the data signal emitted from the first antenna 110 or the second antenna 120, or before the wireless network device 100 emitting the data signal to the base station 300 or the mobile communication device 200, the processing unit 130 can further transform the signal or the code.

For instance, the first antenna 110 is an antenna emitting and receiving the 3G signal, the second antenna 120 is an antenna emitting and receiving the Wi-Fi signal. Therefore, when the wireless network device 100 receives the data signal emitted from the base station 300, the wireless network device 100 transforms the 3G data signal to the Wi-Fi signal and emits the Wi-Fi signal. In addition, in the transforming process, the processing unit 130 can further encrypt the data signal (in contrast is decoded), so as to enhance the safety in the transforming process. In contrast, when the wireless network device 100 receives the data signal emitted from the wireless network device 100, the wireless network device 100 transforms the Wi-Fi data signal to the 3G signal and emits the 3G signal.

It worth noting that, the processing unit 130 can further detect whether the connections between the first antenna 110 and the base station 300 and between the second antenna 120 and the mobile communication device 200 are smooth or not. If one of the connections is interrupted, the processing unit 130 can save the receiving data signal in the storage unit 140 temporary. For example, when the wireless network device 100 disconnects with the base station 300 (for example, when the wireless network device 100 reselects to connect to the base station with the stranger signal), the mobile communication device 200 still connects to the wireless network device 100. Hence, the wireless network device 100 saves the data signal emitting from the mobile communication device 200 in the storage unit 140 temporary and emits the data signal after the wireless network device 100 reconnects to the base station 300. In contrast, when the base station 300 connects to the wireless network device 100, and the mobile communication device 200 disconnect with the wireless network device 100, the wireless network device 100 saves the data signal emitting from the base station 300 in the storage unit 140 temporary and emits the data signal after the wireless network device 100 reconnects to the mobile communication device 200.

The storage unit 140 is utilized to save the necessary information of the wireless network device 100 in the transmitting process. Specifically, the storage unit 140 can provide the wireless network device 100 to save the data of the base station 300 been searched and the data of the mobile communication device 200 connected to the wireless network device 100. The above mentioned data can include the signal strength, the position information, the device information of the base station 300 or the mobile communication device 200. For example, the wireless network device 100 can connect to the base station 300 directly according to the position information of the base station 300 or the position information of the wireless network device 100 saving in the storage unit 140. In addition, the storage unit 140 can be utilized to save the data signal temporary in the transmitting process. In the embodiment of the present invention, the storage unit 140 can be the volatile or the non-volatile storage unit (such as the ROM or the RAM), the present invention is not limited thereto.

The antenna turning control unit 150 is utilized to receive the command of the processing unit 130. The antenna turning control unit 150 controls the turning direction of the directional antenna 120 according to the command. The antenna turning control unit 150 can be the motor. However the present invention is not limited thereto.

Figure 2:
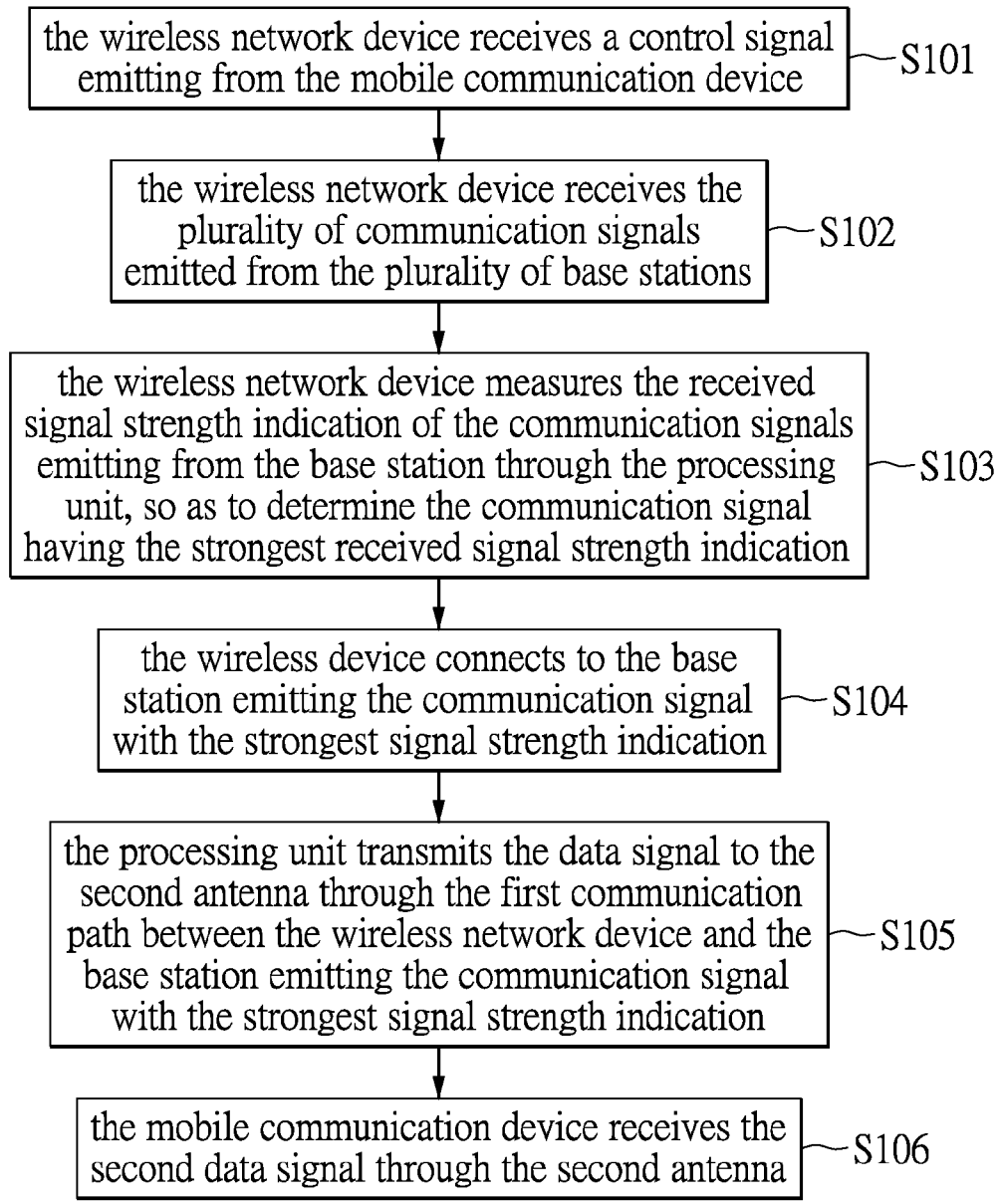
FIG. 2 is a flowchart diagram of the wireless network device provided in accordance to a first embodiment of the present invention.
Figure 3:
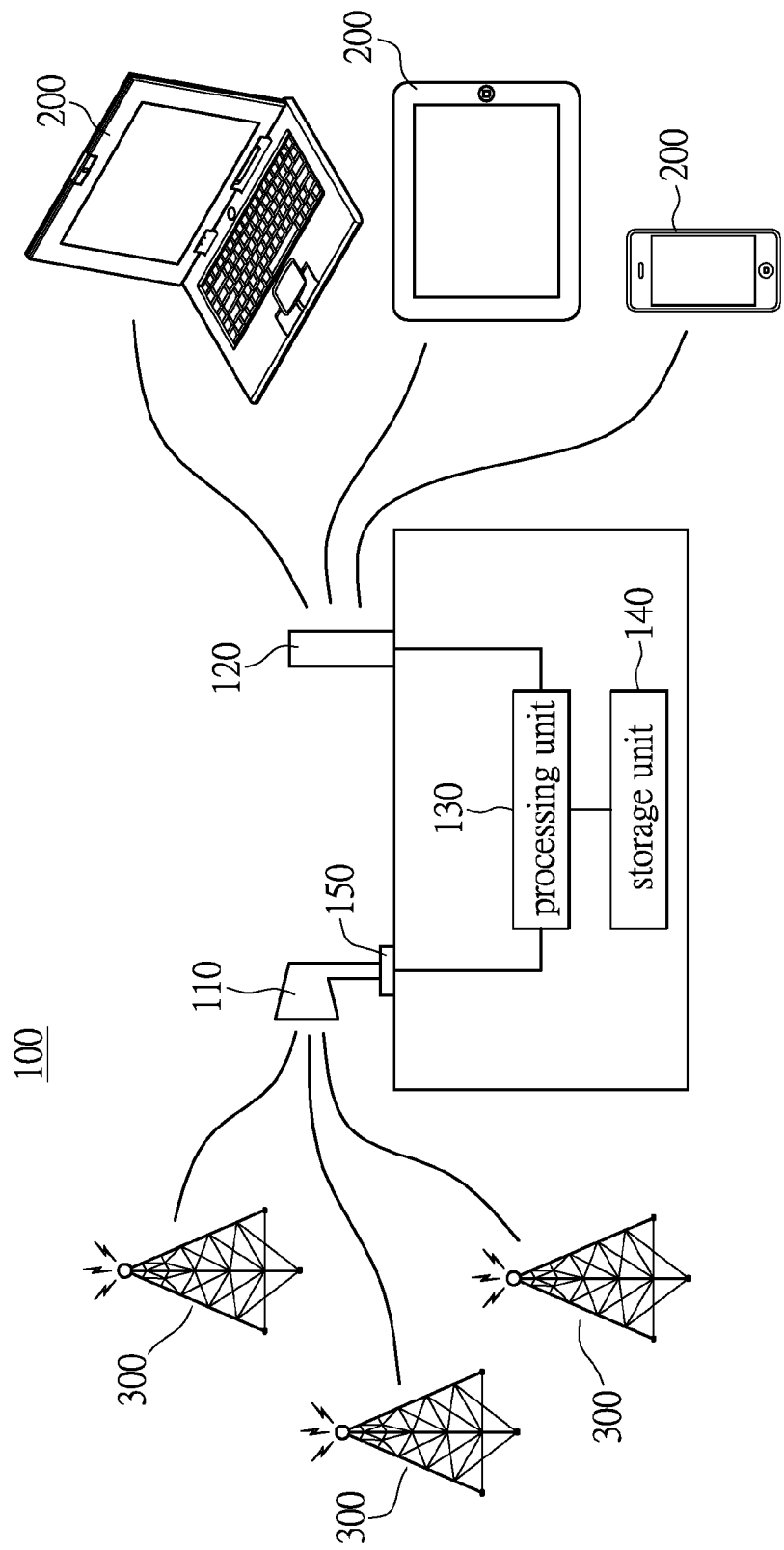
FIG. 3 is an operational schematic of the wireless network device provided in accordance to a first embodiment of the present invention.

FIG. 2 is a flowchart diagram of the wireless network device provided in accordance to a first embodiment of the present invention. FIG. 3 is an operational schematic of the wireless network device provided in accordance to a first embodiment of the present invention. Refer to FIG. 2 and FIG. 3.

In step S101, the wireless network device 100 receives a control signal emitting from the mobile communication device 200. Specifically, when the mobile communication device 200 emits the control signal to the wireless network device 100, the wireless network device 100 receives the control signal through the first antenna 110 and transmits the control signal to the processing unit 130. After the processing unit 130 receiving the control signal, the processing unit 130 generates a command to control the antenna turning control unit 150. The user can wirelessly connect the mobile communication device 200 and the wireless network device 100.

In reality, the mobile communication device 200 has an application. The user can make the mobile communication device 200 generate the control signal to control the wireless network device 100 through the application. It worth noting that, the wireless network device 100 can connect to a mobile communication device 200 alone or connect to a plurality of mobile communication device 200 at the same time. Moreover, the mobile communication device 200 can be electronic communication device such as mobile phone, notebook, or multimedia tablet. However, the type of the mobile communication device 200 and the method of outputting the control signal are not limited to the examples provided by the present invention.

In step S102, the wireless network device 100 receives the plurality of communication signals emitted from the plurality of base stations 300. Specifically, after the processing unit 130 receiving the control signals, the processing unit 130 generates and emits the command to the antenna turning control unit 150. The antenna turning control unit 150 receives the command emitting from the processing unit 130 and controls the turning direction of the directional antenna 120 according to the command. The first antenna 110 turns in all direction and emits the detecting signal. Then, the plurality of the base stations 300 surrounding the wireless network device 100 receive the detecting signal and emit the plurality of communication signals. After that, the first antenna 110 can turn in all direction to receive the communication signals emitted from the plurality of base stations 300.

In step S103, the wireless network device 100 measures the received signal strength indication (RSSI) of the communication signals emitting from the base station 300 through the processing unit 130, so as to determine the communication signal having the strongest received signal strength indication. Specifically, the first antenna 110 transmits the different communication signals emitting from different base stations 300 to the processing unit 130. After receiving the communication signals, the processing unit 130 analyzes the received signal strength indication of the communication signals. The processing unit 130 determines the communication signal having the strongest received signal strength indication according to the received signal strength indication of the communication signals.

In step S104, the wireless device 100 connects to the base station 300 emitting the communication signal with the strongest signal strength indication. Specifically, the processing unit 130 determines how to control the turning direction of the motor 150 by determining the communication signal with the strongest signal strength indication. In other words, the processing unit 130 can determines the direction of the base station 300 according to the communication signal having the strongest received signal strength indication. After that, the processing unit 130 generates a driving signal Sd to drive the motor 150, so that the motor 150 can control the turning direction of the first antenna 110 and connect to the base station 300 emitting the first communication signal Sm1.

Specifically, after the wireless network device 100 connecting to the base station 300, the wireless network device 100 and the base station 300 establish a first communication path between. The mobile communication device 200 can further transmit the data signal with the base station 300 through the wireless network device 100. It worth noting that, the mobile communication device 200 can transform the data signal into the first data signal through the wireless network device 100. For example, when the mobile communication device 200 transmits the Wi-Fi data signal to the wireless network device 100, the wireless network device 100 further transforms the data signal into the 3G first data signal and emits to the base station 300 from the first antenna 110 through the first communication path.

In step S105, the processing unit 130 transmits the data signal to the second antenna 120 through the first communication path between the wireless network device 100 and the base station 300 emitting the communication signal with the strongest signal strength indication. Specifically, the first antenna 110 receives the first data signal transmitting from the base station 300 and the processing unit 130 transforms the first data signal into the second data signal. The wireless network device 100 and the mobile communication device 200 establish a second communication path between. The second data signal transmits through the second communication path.

It worth noting that, the first data signal is the signal emitting from the base station 300, for example, the first data signal can be the 3G mobile communication signal, 4G mobile communication signal, WiMAX signal, or LTE signal etc. The second data signal is the signal emitting or receiving from the mobile communication device 200. The second data signal can be the Wi-Fi signal, the Bluetooth signal, or other short-range wireless transmitting signal. For instance, the processing unit 130 can transform the 3G signal emitting from the base station 300 into the Wi-Fi signal. Then, the processing unit 130 transmits the second data signal to the second antenna 120 through the second communication path. Moreover, it worth noting that, when the first antenna 110 disconnects with the base station 300 emitting the first data signal, the second data signal can save in the storage unit 140 temporary. After the first antenna 110 reconnecting to the base station 300, the storage unit 140 transmits the first data signal temporary saves to the first antenna 110.

In step S106, the mobile communication device 200 receives the second data signal through the second antenna 120. The second data signal is transformed from the first data signal by the wireless network device 100. In other words, the wireless network device 100 can wirelessly connect to the mobile communication device 200 through the second communication path. It worth noting that, the second antenna 120 can be the omnidirectional antenna, the mobile communication device 200 can wirelessly connect to the wireless network device 100 through the second antenna 120 and emit-receive the second data signal. In addition, in order to make the network connection quality more stable, the second antenna 120 can be the directional antenna. The wireless network device 100 can utilize another antenna turning control unit (not shown in figure) to drive the turning direction of the second antenna 120, so as to make the connection quality between the second antenna 120 and the mobile communication device 200 more stable.

Moreover, it worth noting that, when the second antenna 120 disconnects with the mobile communication device 200, the information of the first data signal saves in the storage unit 140 temporary. After the second antenna 120 reconnecting to the mobile communication device 200, the storage unit 140 transmits the information of the first data signal temporary saves to the base station 300.

To sum up, the present invention provides a method of controlling wireless network device for network connectivity. The mobile communication device connects to the wireless network device thorough the control signal. The first antenna receives at least a communication signal emitted from the base station. The processing unit determines the communication signal having the strongest received signal strength indication and generates the driving signal to the antenna turning control unit. The antenna turning control unit receives the driving signal to drive the first antenna changing the direction and connect to the base station emitting the communication signal with the strongest signal strength indication. In other words, the first antenna connects to the base station emitting communication signal with the strongest signal strength by controlling the turning direction of the first antenna. Then, the communication signal with the strongest signal strength indication is transmitted to the mobile communication device through the second antenna, so as to enhance the quality of communication signal received by the mobile communication device.

Hence, compare to the conventional method of network connectivity, the method of controlling wireless network device for network connectivity in the present invention can replace the function about searching the signal of the base station of the built-in antenna of the mobile communication device. When the user utilizes the mobile communication device in motion, the built-in antenna of the mobile communication device does not have to search the stronger signal of the base station along with different positions. Therefore, the reception quality of the mobile communication device can be enhanced and the power consumption of the mobile communication device can saves automatically.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of controlling a wireless network device for network connectivity, comprising:
   receiving, by the wireless network device, a control signal emitted from a mobile communication device;
   activating the wireless network device to search for base stations according to the control signal emitted from the mobile communication device,
   receiving, by the wireless network device, a plurality of communication signals emitted from a plurality of base stations;
   measuring the received signal strength indication of the communication signals emitted from the plurality of base stations to identify a communication signal having the strongest received signal strength indication;
   connecting the wireless network device to the base station emitting the communication signal having the strongest signal strength indication; and
   connecting the mobile communication device to the wireless network device, and then establishing network connectivity between the mobile communication device and the base station emitting the communication signal having the strongest signal strength indication through the wireless network device.

2. The method of controlling wireless network device for network connectivity of claim 1, wherein the wireless network device comprises a first antenna and a processing unit, and the communication signals are received by the first antenna, and the received signal strength indication of the communication signals are measured by the processing unit.

3. The method of controlling wireless network device for network connectivity of claim 2, wherein the first antenna is a directional antenna.

4. The method of controlling wireless network device for network connectivity of claim 3, wherein the step of receiving the communication signals emitted from the base stations comprising:
   controlling the deflection of the first antenna by the processing unit such that the first antenna captures the communication signals emitted from the base stations.

5. The method of controlling wireless network device for network connectivity of claim 2, wherein the step of connecting the mobile communication device to the wireless network device and establishing network connectivity between the mobile communication device to the base station emitting the communication signal having the strongest signal strength indication comprising:
   transmitting a data signal from the base station to the wireless network device, and transmitting the data signal from the processing unit to a second antenna of the wireless network device;
   receiving the data signal by the mobile communication device through the second antenna of the wireless network device.

6. The method of controlling wireless network device for network connectivity of claim 5, wherein the second antenna and the mobile communication device establish a second communication path between.

7. The method of controlling wireless network device for network connectivity of claim 6, wherein the wireless network device has a storage unit, when the second antenna disconnects with the mobile communication device, the first data signal temporary saves in the storage unit.

8. The method of controlling wireless network device for network connectivity of claim 2, wherein the first antenna and the base station emitting the communication signal with the strongest signal strength indication establish a first communication path between.

9. The method of controlling wireless network device for network connectivity of claim 8, wherein the wireless network device has a storage unit, when the first antenna disconnects with the base station emitting the communication signal having the strongest signal strength indication, the second data signal emitted from the mobile communication device temporary saves in the storage unit.

10. The method of controlling wireless network device for network connectivity of claim 2, wherein the wireless network device further comprises an antenna turning control unit, the antenna turning control unit receives a command from the processing unit to control a turning direction of the first antenna, and the first antenna turns its direction to face a base station having the strongest communication signals and receive the signals therefrom.

11. The method of controlling wireless network device for network connectivity of claim 1, wherein the mobile communication device has an application generating and outputting the control signal.

* * * * *